United States Patent Office 3,056,714
Patented Oct. 2, 1962

3,056,714
BEATER SATURATED ASBESTOS PRODUCTS CONTAINING FLUORESCENT BRIGHTENING AGENTS
David A. Feigley, Jr., Manor Township, Lancaster County, and Leonard N. Ray, Jr., East Hempfield Township, Lancaster County, Pa., assignors to Armstrong Cork Company, Lancaster, Pa., a corporation of Pennsylvania
No Drawing. Filed Feb. 10, 1959, Ser. No. 792,257
13 Claims. (Cl. 162—155)

This invention relates generally to fibrous products and more particularly to water-laid products of chrysotile asbestos fibers. Still more particularly the invention relates to the deposition of the rubber content of a synthetic rubber latex upon chrysotile asbestos fibers while in suspension in water, and thereafter forming the resulting slurry of rubber-coated fibers into products such as sheets and the like.

A simplified flow diagram of the process is as follows:

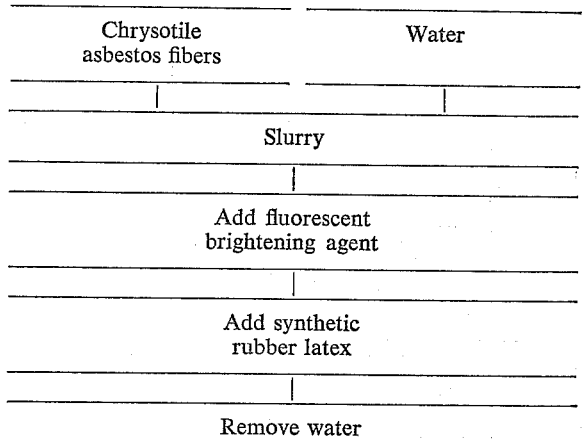

The production of asbestos products by the beater saturation process has always presented difficult problems. The methods which gave good results with cellulose fibers failed completely when applied to asbestos fibers. Asbestos fibers in water produce an ion-filled solution having a relatively high pH. When synthetic rubber latices are added to such a slurry, clumping promptly occurs. Thus it has been necessary in the past to devise particular processes—different from those concerning cellulosic fibers—which will allow the even deposition of a rubber binder onto asbestos fibers in order that products may be formed therefrom. One successful process to accomplish this result is known as the citrate process and is fully described in U.S. Patent 2,759,813—Feigley, issued August 21, 1956. The citrate process is highly effective. However, it is desirable to have alternate processes which give the excellent results of the citrate process but which are more economical and which produce products which have a different appearance to the eye from those produced by the normal processes. In copending application Serial No. 728,533, filed April 15, 1958, there is described a process wherein the asbestos fibers are prereacted with certain classes of organic dyes in order to render the asbestos fibers amenable to the deposition of rubber thereon. The process there described will always produce a highly colored sheet. Thus there is a need for an alternate process which can easily and cheaply produce a white-colored sheet.

It is the primary object of the present invention to supply such a process. It is a further object of the present invention to present a simple, economical, easily-controlled process for the production of white-colored products from rubber-coated asbestos fibers. It is a further object of the present invention to present a product prepared from rubber-coated asbestos fibers, which product possesses a bright, white color.

The invention contemplates forming a slurry of chrysotile asbestos fibers in water. To this slurry there is added a water-soluble, fluorescent brightening agent selected from the group consisting of stilbene dyes and thiazole dyes. The fluorescent dye reacts with the surfaces of the chrysotile asbestos fibers, leaving the fibers in their natural colored state, but rendering them receptive to deposition thereon of a rubber binder. A synthetic rubber latex is then added to the dye-treated slurry. Simple agitation then brings about deposition of the rubber content of the synthetic rubber latex onto the dye-treated chrysotile asbestos fibers. The resulting slurry of evenly coated asbestos fibers is then formed into a product such as a sheet by removing water therefrom.

The slurry of chrysotile asbestos fibers may be formed in known manner. The fibers are added to sufficient water in a chest or other convenient container in an amount such that the resulting slurry contains about 0.3–3% by weight fibers. The preferred consistency of the slurry is about 1% by dry weight asbestos based on the total weight of the slurry. The slurry will be subjected to mechanical refining as in a beater, Jordan engine, disc refiner, or the like to produce a slurry wherein the fibers have been reduced to the desired degree of length and diameter. Refining will generally be equivalent to that produced in about 5–15 minutes in a Valley laboratory beater with standard weights.

The slurry is then ready for the addition of the fluorescent brightening agent. These fluorescent brightening agents are water-soluble, fluorescent compounds of the anionic type which are also known in the trade as optical brighteners, optical bleaches, and fluorescent brighteners. Not all of the fluorescent brightening agents are operable in the present invention, however. Only two classes of brightening agents are operable, namely the stilbene fluorescent brightening agents and the thiazole fluorescent brightening agents.

The particular fluorescent brightening agent within the stilbenes or the thiazoles selected for use in the present invention will be chosen primarily on the basis of effectiveness, availability, and cost. Mixtures of dyes can be used if desired. The amount of dye to be used will generally be in the range of about 0.1–15% by weight dye based on the dry weight of the asbestos fibers. More preferably the amount will be in the range of about 1–8% by weight fluorescent dye based on the dry weight of the fibers.

In this application the various dyes will be identified primarily by the new Color Index (CI) numbers and by the FBA (fluorescent brightening agent) numbers rather than by the unwieldy chemical structures. Each of the new Color Index numbers identifies one and only one dye having a specific chemical structure, or the procedure for preparing that dye. The precise chemical formula for method of synthesis for each dye described herein can be obtained by reference to the publication, Colour Index, Second Edition, volumes 1, 2, 3, and 4, published by the Society of Dyers and Colourists, and the American Association of Textile Chemists and Colorists, 1956.

The dye is most conveniently added to the slurry of chrysotile asbestos fibers in the form of a water solution. The dye solution may simply be poured into the chest or other container containing the asbestos slurry. The resulting mixture should be agitated in order to give the dye the opportunity to react with all the surfaces of the asbestos fibers. Such reaction generally takes place within 10 minutes and more usually within five minutes. The reaction of the dye with the asbestos fibers does not produce any noticeable physical change in the color or other properties in the asbestos slurry. The Canadian 3-gram freeness of the 1% consistency asbestos slurry is about 50 prior to the addition of the fluorescent dye and it remains at 50 after the dye has reacted with the asbestos. Chemically, however, the individual asbestos fibers have been greatly modified. If a synthetic rubber latex were to be added to the slurry prior to the dye addition, the rubber simply forms balls and agglomerates, and the entire slurry is useless. However, when the rubber latex is added subsequent to the reaction of the proper amount of dye with the asbestos fibers, the rubber content of the synthetic rubber latex smoothly and evenly deposits onto the dye-reacted fibers with no outside aid save agitation. Thus it can be seen that the dyes are used in the present invention as chemicals to modify the chemical characteristics of asbestos fibers in a manner which allows the rubber to deposit on the fibers. The mechanism of the reaction between the dye and the chrysotile asbestos fibers is not understood. In any case, once the dye has reacted with the asbestos fibers, the slurry is then ready for the addition of the synthetic rubber latex.

The latex to be added may be any of a number of synthetic rubbers used in the practice of conventional beater saturation methods. Typical of these synthetic rubbers are the products known as GR-S (SBR) which are copolymers of butadiene and styrene containing about 50% to about 75% by weight butadiene. There may also be used the rubbers designated as Buna N or Hycar (NBR); these are copolymers of butadiene and acrylonitrile containing about 50% to about 80% by weight butadiene. The neoprenes (CR) may also be used. The neoprenes are polymers of 2-chloro-butadiene-1,3, which polymers are also known as polychloroprenes. There may be employed the homopolymers of butadiene (BR) as well as homopolymers and/or copolymers of butadiene homologues such as the isoprene rubbers (IR). These are the materials which are generally designated as synthetic rubbers herein. They may be more specifically designated as rubber-like polymers of butadiene, isoprene, and chloroprene, and rubber-like copolymers of butadiene or isoprene with copolymerizable vinyl compounds such as styrene and acrylonitrile. These synthetic rubbers are added to the slurry in the form of their latices. The latices normally contain about 25% to about 50% by weight rubber solids. The latices contain additional compounding ingredients such as stabilizers and the like which are well-known to the art and which form no part of the present invention.

The synthetic rubber latex is added as such to the dye-treated slurry of chrysotile asbestos fibers. The entire mass is agitated whereby it will be found that the rubber content of the synthetic rubber latex will deposit evenly and smoothly onto the dye-reacted chrysotile asbestos fibers. The resulting slurry of rubber-coated fibers is then formed into a product such as a sheet either on conventional papermaking equipment such as a Fourdrinier wire or cylinder machine, or in shaped molds which allow the draining of the water while retaining the rubber-coated fibers.

The amount of rubber to be deposited onto the fibers may be selected in accordance with the requirements of the final product. Generally speaking, the amount of rubber deposited on the fibers will be in the range of about 10%–75% by weight rubber based on the dry weight of the fibers. Where the final product is to be a sheet from which gaskets are to be cut, the amount of rubber in the sheet will be adjusted in accordance with the requirements of the particular use for the particular gasket. Most frequently it will be found that about 20%–30% by weight rubber based on the dry weight of the asbestos fibers yields good all-around sheet goods which lend themselves to gasketing application and to use of the product as a backing for floor covering materials such as plastic flooring sheets and tiles. It is frequently advantageous to include any of the usual rubber antioxidants in the slurry in order to minimize oxidation of the rubber coating on the fibers during use.

The following examples illustrate several embodiments of the invention. All parts are by weight unless otherwise stated.

*Example 1*

Into 12,000 parts of water was placed 240 parts chrysotile asbestos fibers (5D), and the slurry was beaten for 15 minutes. Slurry samples containing 37.5 parts asbestos (dry basis were withdrawn and diluted to 1% consistency to give a series of slurries in which slurry contained 37.5 parts asbestos and 3,750 parts water. To each slurry was added two parts of the rubber antioxidant, Flectol H, which is polymerized 1,2-dihydro-2,2,4-trimethylquinolin, followed by the selected amount of the fluorescent brightening agent. After agitation there was added 18.8 parts of a 40% solids butadiene-styrene copolymer latex (GRS–2000) and gentle agitation was maintained in the mixture.

The table below identifies the particular stilbene dye used and also states the time required for the rubber to completely precipitate onto the asbestos fibers. The amount of dye used in each case is also listed. The stated Canadian 3-gram freeness is the freeness found in the slurry after completed deposition of the rubber onto the asbestos fibers. Following are the results:

| Name of Dye | Colour Index Number | Amount of Dye, Parts | Canadian Freeness | Precipitation Time, Minutes |
|---|---|---|---|---|
| Tinopal 4BM | FBA-22 | 0.5 | 780 | 24 |
| Tinopal BVA | 40630 | 2.0 | 650 | 10 |
| Tinopal SP | FBA-18 | 0.5 | 50 | 8 |
| Do | FBA-18 | 0.3 | 700 | 10 |
| Tinopal GS | FBA-47 | 1.5 | 730 | 15 |
| Blancophor HS-71 | FBA-25 | 0.6 | 790 | 13 |
| Do | FBA-25 | 0.7 | 730 | 7 |
| Do | FBA-25 | 0.6 | 770 | 7 |
| Do | FBA-25 | 0.8 | 610 | 6 |
| Do | FBA-25 | 0.9 | 600 | 7 |
| Do | FBA-25 | 1.0 | 480 | 6 |
| Blancophor HS-76 | FBA-25 | 0.5 | 240 | 8 |
| Blancophor R | 40600 | 2.0 | 770 | 20 |
| Uvitex P | FBA-29 | 1.5 | 750 | 24 |
| Uvitex GS | FBA-42 | 3.0 | 810 | 9 |
| Do | FBA-42 | 5.0 | 730 | 7 |
| Pontamine White 2GT | 40605 | 2.0 | 610 | 9 |
| Pontamine White BR | 40600 | 2.0 | 790 | 20 |
| DuPont Paper White BP | FBA-28 | 1.0 | 780 | 15 |
| Fluorescent Purple 2G | 36900 | 2.0 | 230 | 10 |
| Fluorosol WS | 40640 | 12.0 | 790 | 12 |

*Example 2*

Example 1 was repeated save that the fluorescent brightening agent added to the asbestos slurry was the thiazole dye identified as Uvitex RS (CI49015) in an amount of five parts. Precipitation was complete in six minutes, and the resulting Canadian freeness was 710.

The above run was repeated save that there were used 15 parts of a 51% solids polychloroprene latex (Neoprene 750). An excellent rubber-bonded asbestos sheet resulted.

The run was repeated save that there were used 19 parts of a 41% solids butadiene-acrylonitrile copolymer latex (Hycar 1561). A strong, rubber-bonded asbestos sheet resulted.

We claim:

1. A method of making a beater saturated asbestos products comprising forming a slurrry of chrysotile asbestos fibers in water, adding to said slurrry a water-soluble fluorescent brightening agent selected from the group consisting of stilbene dyes and thiazole dyes, which dye reacts with the surfaces of said chrysotile asbestos fibers, adding a synthetic rubber latex to the resulting slurrry while agitating said slurry, whereby the rubber content of said latex deposits evenly on said chrysotile fibers, and forming the resulting slurry of rubber-coated fibers into a product by removing water therefrom.

2. A method according to claim 1 wherein said synthetic rubber comprises a butadiene-styrene copolymer.

3. A method according to claim 1 wherein said synthetic rubber comprises a butadiene-acrylonitrile copolymer.

4. A method according to claim 1 wherein said synthetic rubber comprises a polychloroprene.

5. A method according to claim 1 wherein said fluorescent brightening agent is present on said fibers in an amount of about 0.1–1.5% by weight based on the dry weight of the fibers.

6. A method according to claim 1 wherein said fluorescent brightening agent is present on said fibers in an amount of about 1%–8% by weight based on the dry weight of the fibers.

7. A method according to claim 1 wherein said fluorescent brightening agent comprises a stilbene dye.

8. A method according to claim 1 wherein said fluorescent brightening agent comprises a thiazole dye.

9. A water-laid product comprising chrysotile asbestos fibers whose surfaces are reacted with 0.1%–15% by weight based on the weight of said fibers of a water-soluble fluorescent brightening agent selected from the group consisting of stilbene dyes and thiazole dyes, said dye-reacted fibers having deposited thereon an outer coating of a synthetic rubber.

10. A product according to claim 9 wherein said synthetic rubber comprises a butadiene-styrene copolymer.

11. A product according to claim 9 wherein said synthetic rubber comprises a butadiene-acrylonitrile copolymer.

12. A product according to claim 9 wherein said synthetic rubber comprises a polychloroprene.

13. A product according to claim 9 wherein said synthetic rubber is present in an amount of about 10%–75% by weight based on the dry weight of said fibers.

References Cited in the file of this patent

UNITED STATES PATENTS

| | | |
|---|---|---|
| 1,956,053 | Tucker | Apr. 24, 1934 |
| 2,198,800 | Badollet | Apr. 30, 1940 |
| 2,301,998 | Bernstein | Nov. 17, 1942 |
| 2,485,458 | Quinn et al. | Oct. 18, 1949 |
| 2,661,288 | Barbaras | Dec. 1, 1953 |
| 2,666,699 | McQuiston | Jan. 19, 1954 |
| 2,698,788 | Greenman et al. | Jan. 4, 1955 |
| 2,700,043 | Baum et al. | Jan. 18, 1955 |
| 2,730,446 | Hutchins | Jan. 10, 1956 |
| 2,759,813 | Feigley | Aug. 21, 1956 |
| 2,797,163 | Smith et al. | June 25, 1957 |
| 2,807,543 | McQuiston | Sept. 24, 1957 |
| 2,924,549 | Klein et al. | Feb. 9, 1960 |
| 2,930,106 | Wortnowski | Mar. 29, 1960 |

FOREIGN PATENTS

| | | |
|---|---|---|
| 595,281 | Great Britain | Dec. 1, 1947 |

UNITED STATES PATENT OFFICE

CERTIFICATE OF CORRECTION

Patent No. 3,056,714             October 2, 1962

David A. Feigley, Jr., et al.

It is hereby certified that error appears in the above numbered patent requiring correction and that the said Letters Patent should read as corrected below.

Column 4, line 10, for "(dry basis" read -- (dry basis) --; line 11, after "which" insert -- each --; same column, lines 64, 65 and 70, for "slurrry" read -- slurry --; column 5, line 9, for "0.1-1.5%" read -- 0.1-15% --.

Signed and sealed this 19th day of February 1963.

(SEAL)
Attest:

ESTON G. JOHNSON
Attesting Officer

DAVID L. LADD
Commissioner of Patents